Sept. 9, 1947.  H. F. HAGEN ET AL  2,427,136
SUPERCHARGER
Filed April 8, 1944  2 Sheets-Sheet 2

Inventors
Harold F. Hagen &
James L. Bartlett, Jr.
by Robert T. Palmer
Attorney.

Patented Sept. 9, 1947

2,427,136

UNITED STATES PATENT OFFICE 2,427,136

SUPERCHARGER

Harold F. Hagen, Wellesley, and James L. Bartlett, Jr., Westwood, Mass., assignors, by mesne assignments, to Westinghouse Electric Corporation, a corporation of Pennsylvania Application April 8, 1944, Serial No. 530,115

1 Claim. (Cl. 230—114)

This invention relates to that class of blowers known as superchargers and relates more particularly to gear driven superchargers for airplane and other internal combustion engines.

Gear driven superchargers are usually geared to the crankshaft of an engine and driven at a fixed speed with relation to the crankshaft. Constant speed propellers are usually used and a constant pressure should be maintained in the supercharged air at the intake manifold of the engine. The full capacity of the supercharger is required when the engine is operating at maximum power and consuming maximum fuel as when the airplane is climbing steeply. When the engine power is reduced as by resumption of level flight after a climb, the prior gear driven superchargers have provided excess pressures which have been dissipated by throttling the air supply. This has resulted in large power losses and in high delivered air temperatures. For reducing such losses, clutches and two speed gears have been used for decreasing the supercharger speed but due to the high rotational speeds involved, have not proved satisfactory.

This invention provides a supercharger driven at a fixed speed with respect to the engine crankshaft and which delivers a constant pressure at the intake mainfold of the engine without any appreciable power losses at reduced engine loads. This is accomplished by spin vanes which spin the air entering the supercharger wheels at reduced engine loads, the degree of spin varying in proportion to the reduction in the engine power.

Another advantage of this invention is that since smaller air pressures are involved, smaller intercoolers may be used.

A feature of this invention resides in the provision of a control responsive to the air pressure at the intake manifold of an engine for adjusting the spin vanes of the supercharger for maintaining a constant pressure at the manifold.

An object of the invention is to provide an improved supercharger.

Another object of the invention is to decrease the power required for engine driven superchargers at reduced engine loads.

The invention will now be described with reference to the drawing, of which:

Figure 1:
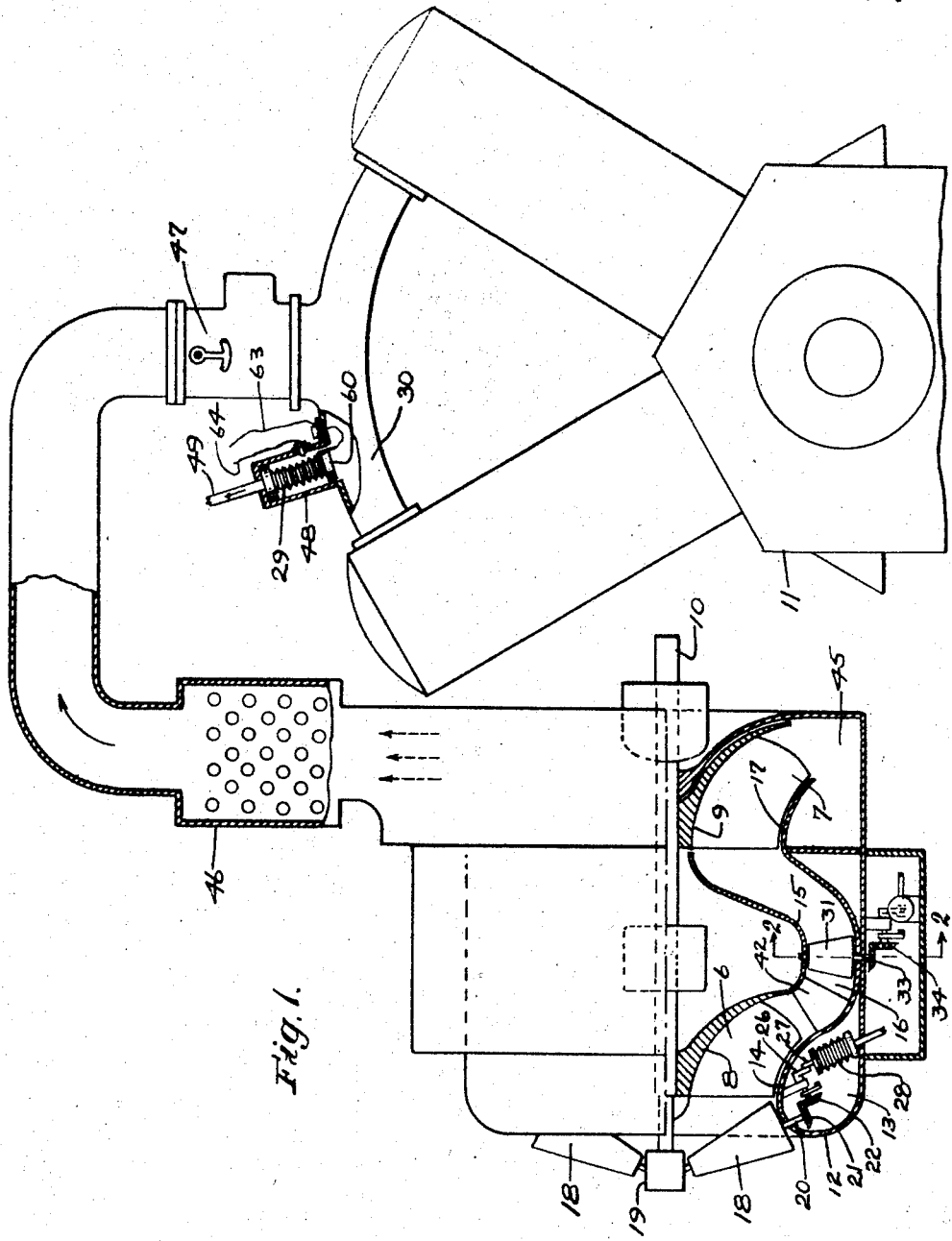
Fig. 1 is a side elevation, partially in section of an engine driven supercharger embodying this invention.

The supercharger illustrated is a two stage supercharger having the first stage blower wheel 6 and the second stage blower wheel 7. The blower wheels are of the type disclosed in the H. F. Hagen application entitled "Centrifugal fans," Serial No. 530,114, filed April 8, 1944.

The wheel 6 has the hub 8 and the wheel 7 has the hub 9 which hubs are keyed to the shaft 10. The shaft 10 is adapted to be driven from the crankshaft of the engine 11 by conventional gearing which is not illustrated since forming no part of this invention.

The casing of the supercharger which is of sheet metal, has the curved wall 12 which forms an enclosure for the vane adjusting mechanism indicated generally by 13; which forms an inlet and outlet shroud at 14 for the wheel 6; which forms with the opposed curved wall 15 an air passage 16 connecting the outlet of the wheel 6 with the inlet of the wheel 7, and which forms an inlet and outlet shroud at 17 for the wheel 7.

The spin vanes 18 mounted in the inlet of the supercharger are of the type disclosed in the H. F. Hagen U. S. Patent No. Re. 20,408 and are supported at their inner ends by the housing 19 on the shaft 10 and at their outer ends by the wall 12 through which their pivot rods 20 extend.

The gears 21 are mounted on the outer ends of the pivot rods 20 and mesh with the gears 22. The gears 22 are keyed to shafts to which are attached levers which in turn are interconnected by links as disclosed in said patent whereby rotation of one of the gears 22 effects adjustment of all of the spin vanes 18.

The shaft on which the lowermost of the gears 22 is attached, has attached thereto the connecting rod 26 which in turn is rotatably attached to the arm 27 of the hydraulic bellows 28. The bellows 28 is actuated by the control bellows 29 which responds to the air pressure in the intake manifold 30 of the engine 11 as will be described.

Figure 2:
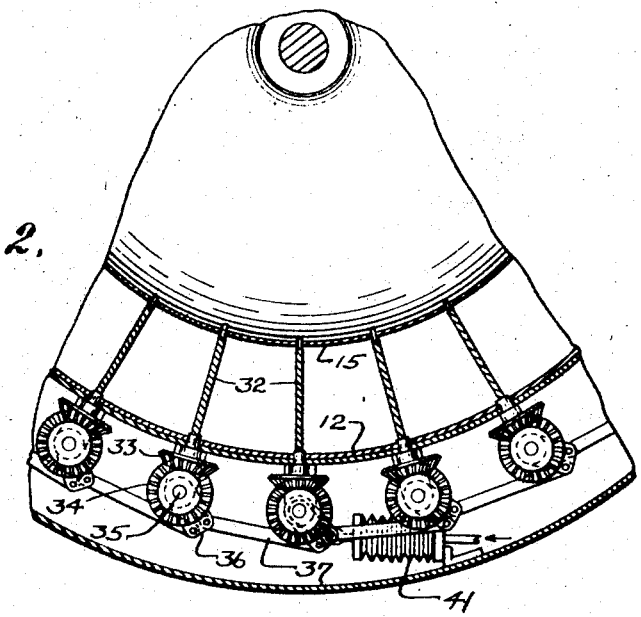
Fig. 2 is an enlarged sectional view along the lines 2—2 of Fig. 1.
Figures 3, 4:
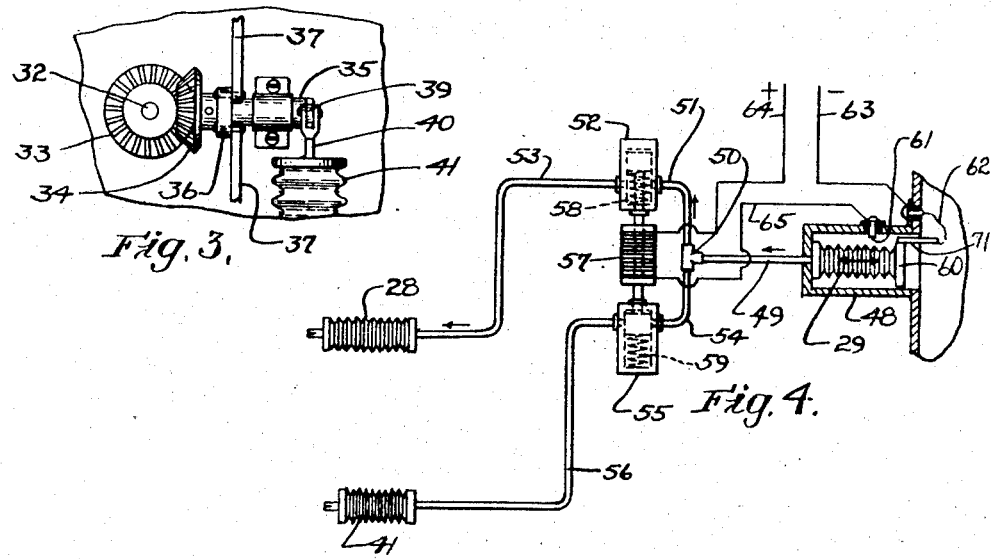
Fig. 3 is an enlarged view of the bellows actuated gear of Fig. 2.
Fig. 4 is a diagrammatic view of the automatic controls used for adjusting the spin vanes of Fig. 1 for maintaining a constant air pressure at the intake manifold of the engine.

The spin vanes 31 are in the passage 16 and their pivot rods 32 rotate in the walls 12 and 15. The outer ends of their pivot rods 32 have attached thereto the gears 33 which mesh with the gears 34 as best illustrated by Figs. 2 and 3. The gears 34 are mounted on the shaft 35 to which are attached the levers 36. The links 37 interconnect the levers 36 whereby rotation of one of the gears 34 effects simultaneous adjustment of all of the vanes 31.

The lowermost of the shafts 35 has attached thereto the connecting rod 39 to which is rotatably attached the arm 40 of the hydraulic bellows 41. The bellows 41 is actuated by the control bellows 29 as will be described.

The passage 16 may have mounted therein between the wheel 6 and the vanes 31, the vanes 42 which preferably are not adjustable and which may be used to take the spin out of the air leaving the wheel 6.

The walls 12 and 15 at the vanes 31 are preferably formed as surfaces of spheres. The vanes 31 preferably have their inner and outer edges formed as circular arcs whereby throughout the range of adjustment of the vanes 31, their curved edges remain parallel to the walls 12 and 15. The vanes thus act more effectively upon the air in the passage 16 throughout their range of adjustment.

The wheel 7 discharges into the conventional outlet scroll casing 45, the outlet of which is connected to the usual intercooler 46. The intercooler 46 is connected to the carburetor 47 of the engine 11.

The intake manifold 30 has the cylindrical enclosure 48 attached thereto and with its interior communicating with the interior of the manifold. The fluid filled control bellows 29 is mounted in the enclosure 48 and is adapted to be contracted upon increases in the manifold pressure above the desired operating level and to expand upon decreases in the manifold pressure below the desired operating level.

The bellows 29 is connected by the tube 49 to the T-connection 50, the tube 51, the valve 52 and the tube 53 to the vane adjusting bellows 28 and is connected by the T-connection 50, the tube 54, the valve 55, and the tube 56 to the vane adjusting bellows 41.

The valves 52 and 55 are actuated by the solenoid so that when one valve is open, the other valve is closed. The spring 58 in the valve 52 biases the valve 52 towards open position while the spring 59 in the valve 55 biases the valve 55 towards closed position.

The piston 60 of the bellows 29 has the contact 71 mounted thereon and which is connected by the wires 62 and 63 to one side of a suitable scource of electric current for energizing the solenoid 57. The other side of the electric source is connected by the wire 64 to one side of the solenoid 57 and the other side of the solenoid is connected by the wire 65 to the contact 61 within the enclosure 48.

Normally the valve 59 is closed as illustrated by Fig. 4. Upon an increase in the manifold pressure above that desired, the contraction of the bellows 29 causes expansion of the bellows 28 and thereby causes the bellows 28 to adjust through the described mechanism 13, the spin vanes 18 towards closed (maximum spin inducing) position for decreasing the air pressure at the intake manifold.

If adjustment of the spin vanes 18 to a predetermined maximum spin inducing position is insufficient to lower the manifold pressure, the contact 71 is moved by the bellows 29 onto the slide contact 61 thereby energizing the solenoid 57 and causing same to close the valve 52 and to open the valve 55. This transfer the bellows 29 to control of the bellows 41 which, upon further contraction of the bellows 29, adjusts the spin vanes 31 towards closed position.

While the control of the spin vanes has been described as being accomplished by first adjusting one set of vanes and if that was insufficient, by then adjusting the second set of vanes, the controls could be used to adjust both sets of vanes simultaneously or either set separately.

As an illustration of the application of the invention to an airplane engine driving a constant speed propeller, the pitch of which is adjusted automatically for maintaining a constant engine speed, a pressure of say 50" of water is desired in the intake manifold at the condition of maximum load which may be that of maximum airplane speed at maximum altitude. At altitudes below the design maximum, the pressure in the intake manifold provided by the prior gear driven superchargers increases and the air supply would have to be throttled for dissipating the excess pressure in a substantial resistance loss. Utilizing this invention, the pressure provided by the supercharger is maintained at 50" at all times and without any appreciable loss at reduced loads.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

A supercharger for an internal combustion engine having an intake manifold, comprising a first blower wheel, a second blower wheel having its inlet connected to the outlet of said first wheel, said wheels being arranged for rotation in the same direction, the outlet of said second wheel being connected to said manifold, spin vanes in the inlets of both of said wheels, and means including means responsive to the air pressure in said manifold for adjusting the vanes in the inlet of one of said wheels for producing spin in the direction of wheel rotation upon a given pressure increase and for then adjusting the vanes in the inlet of the other of said wheels for producing spin in the direction of wheel rotation for producing spin upon a pressure increase greater than said given increase.

HAROLD F. HAGEN.
JAMES L. BARTLETT, Jr.

REFERENCES CITED

The following references are of record in the file of this patent:

UNITED STATES PATENTS

| Number | Name | Date |
|---|---|---|
| 1,418,704 | Green | June 6, 1922 |
| 1,928,332 | Downs | Sept. 26, 1933 |
| 1,989,966 | Biggs | Feb. 5, 1935 |
| 786,384 | Richards | Apr. 4, 1905 |
| 1,629,141 | Benson | May 17, 1927 |
| 1,798,787 | Conant | Mar. 31, 1931 |
| 2,300,766 | Baumann | Nov. 3, 1942 |

FOREIGN PATENTS

| Number | Country | Date |
|---|---|---|
| 544,440 | Great Britain | Apr. 14, 1942 |
| 703,364 | Germany | Mar. 7, 1941 |
| 398,640 | France | Mar. 29, 1909 |